United States Patent

[11] 3,594,583

| [72] | Inventor | Edward Emanuel Sheldon |
| | | 30 East 40th St., New York, N.Y. 10016 |
| [21] | Appl. No. | 573,932 |
| [22] | Filed | Aug. 22, 1966 |
| [45] | Patented | July 20, 1971 |

[54] ELECTRO-OPTICAL DEVICES FOR DETECTING IMAGES OF INVISIBLE RADIATIONS USING INTERACTION OF LIGHT BEAMS
18 Claims, 26 Drawing Figs.

[52] U.S. Cl. .................................................. 250/220, 250/213, 350/161, 350/163
[51] Int. Cl. ...................................................... H01l 17/00
[50] Field of Search............................................ 350/161, 163; 88/14 I; 250/213, 220

[56] References Cited
UNITED STATES PATENTS

| 2,281,280 | 4/1942 | Gabor ........................... | 350/161 X |
| 2,424,976 | 8/1947 | Golay et al.................... | 350/161 |
| 2,557,096 | 6/1951 | Golay ........................... | 350/161 X |
| 3,001,447 | 9/1961 | Ploke ............................ | 350/161 |
| 3,050,725 | 8/1962 | Kuecken ...................... | 88/14 I |
| 3,100,817 | 8/1963 | Rosendahl.................... | 88/14 I |
| 3,202,052 | 8/1965 | Rambauske et al........... | 350/163 |
| 3,302,027 | 1/1967 | Fried et al..................... | 350/163 X |
| 3,306,160 | 2/1967 | Dinhobel et al. ............. | 350/161 X |

OTHER REFERENCES
A. P. C. Application of H. W. Paehr, Ser. No. 354,771, Published 5/18/43 (350-161)
Fried et al. " An Interferometric Optical Modulator," APPLIED OPTICS, vol. 3, No. 6, June 1964, PP. 697— 701 (88-14 1)
Brickl et al. IBM TECHNICAL DISCLOSURE, Vol. 6 No. 7, Dec. 1963, p. 54, (88-14 I)

*Primary Examiner*—William F. Lindquist
*Assistant Examiner*—Martin Abramson
*Attorney*—Polachek & Saulsbury ABSTRACT: This invention relates to devices for detecting images of invisible radiations and reproducing them as visible images. These devices are provided with detecting means which upon irradiation by a beam of invisible radiation carrying the image of the examined body exhibit various "optical" changes. These changes are analyzed in a scanning mode point after point by a monochromatic light beam which after recombination with nonmodulated part of said monochromatic light beam provides readout information about said invisible image. This scanning readout is characterized by means providing the same angle of incidence of light beams on all successive points of said detecting means. The above readout information is received and subsequently converted by photoelectric means into an image.
In another embodiment of this invention instead of scanning readout means are provided to produce simultaneously a plurality of combined monochromatic light beams for simultaneous readout of said optical changes. It is also characteristic for this embodiment that photoelectric means receive said plural combined light beams simultaneously.

INVENTOR.
EDWARD EMANUEL SHELDON

BY

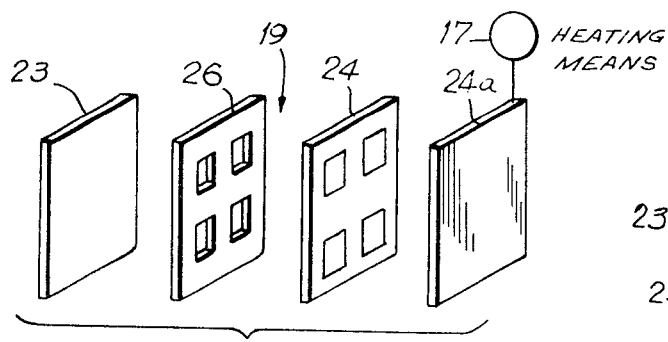
FIG. 2A
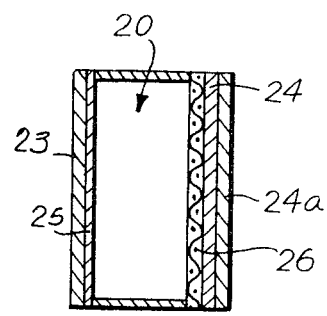
FIG. 2B
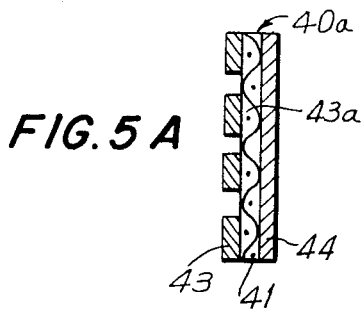
FIG. 5A
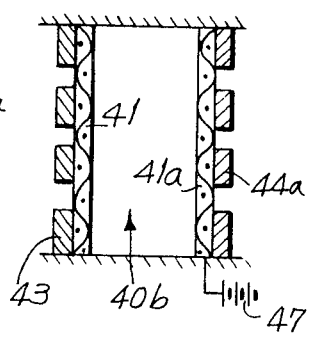
FIG. 5B
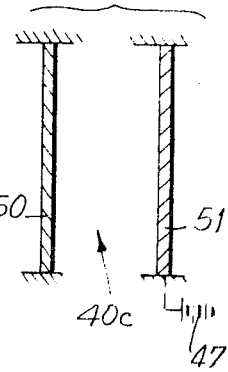
FIG. 5C
FIG. 5
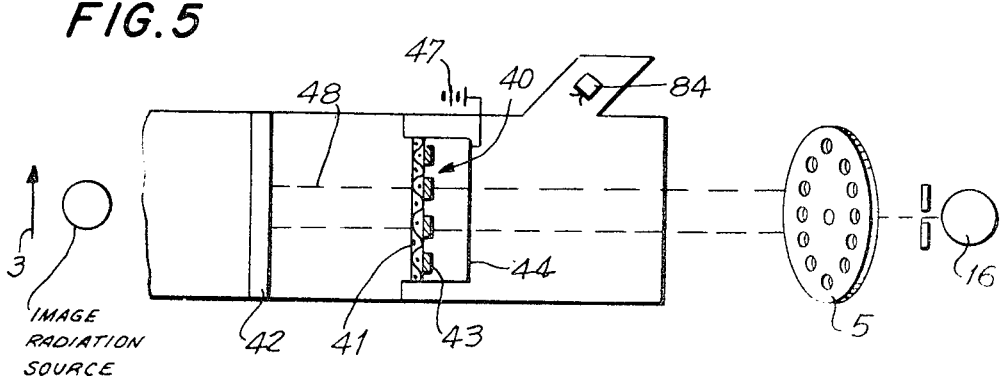
INVENTOR.
EDWARD EMANUEL SHELDON

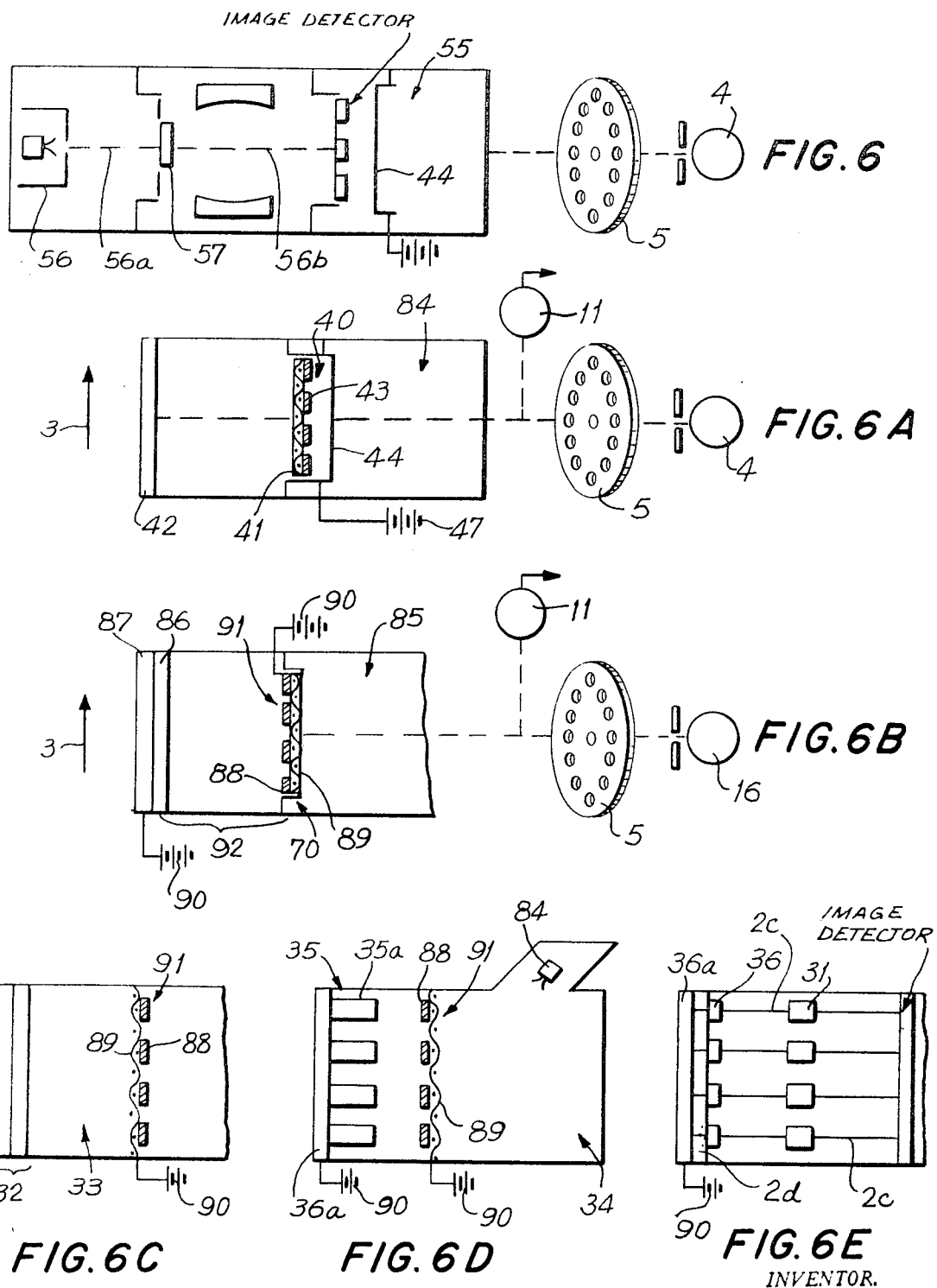

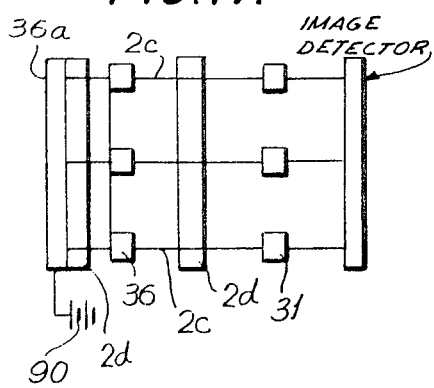
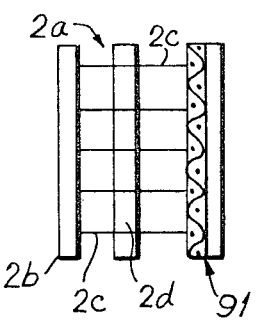
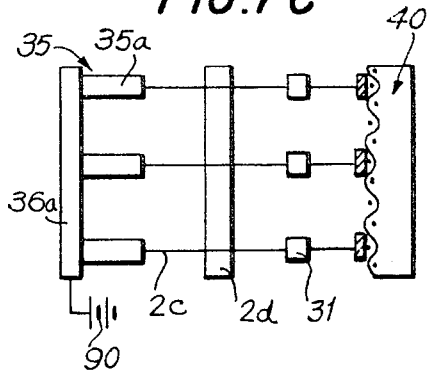
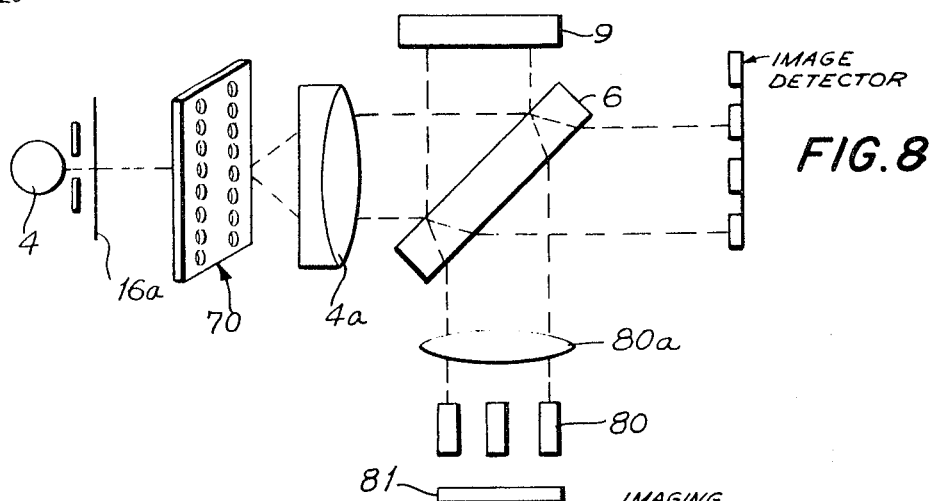
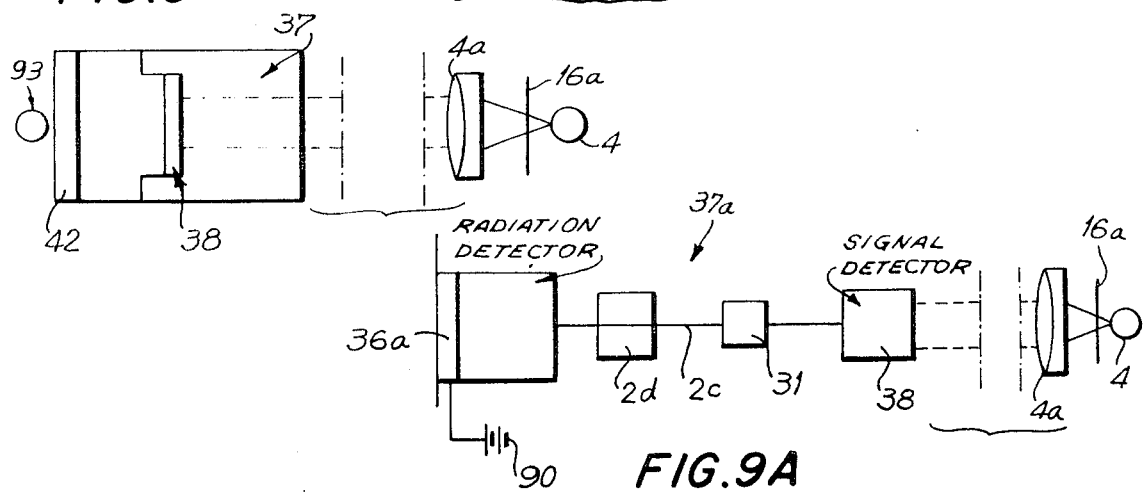

ELECTRO-OPTICAL DEVICES FOR DETECTING IMAGES OF INVISIBLE RADIATIONS USING INTERACTION OF LIGHT BEAMS

This invention relates to novel imaging devices for images produced by a visible or invisible radiation. It applies to images produced by all visible or invisible radiation such as X-rays, infrared, ultraviolet or by beams of atomic particles such as electrons, protons or neutrons or by sonic or supersonic radiations or by ions.

The most sensitive television imaging devices used at present are limited either by the noise of the scanning electron beam as it is in the image orthicon type or by the noise of amplifiers as it is the case in the vidicon type of pickup tube. The most sensitive devices for infrared waves are limited by the lack of sensitive photodetectors which are able to produce a two-dimensional electrical image in response to said radiation. It is well known in the art that all infrared imaging devices for two-dimensional images operate only up to a few microns wavelength of infrared and only scanning illumination devices can be used for longer infrared waves, or submillimeter waves.

It is the purpose of this invention to remove these limitations and to provide a novel imaging system which will be able to operate at any wavelength and with any type of imaging radiation.

Another purpose of this invention is to provide a novel imaging device which exhibits much higher sensitivity than the present devices.

Another purpose of my invention is to replace the vacuum tube type of photodetector with nonvacuum device.

The purposes of this invention were accomplished by a novel device which upon absorption of image-forming radiation exhibits optical changes, such as changes of the index of refraction or of optical density or changes in shape or dimensions of its surface and produces thereby a physical relief pattern corresponding to the image. Such radiation detectors may have various embodiments such as of piezoelectric transducer type or of electron or charge-responsive member of electrostatic type, or of gas cells type with a deformable membrane.

It should be understood that the words "optical changes", as used in the specification and in the appended claims, comprise deformity changes such as changes in size or shape and also changes of the index of refraction and also changes of the phase of the light.

The readout of said optical deformity changes is accomplished in my device not by a scanning electron beam as it is practiced in the devices of the prior art but directly by a light beam. The readout light beam in one embodiment of invention irradiates the surface of the image detector in a scanning fashion and is modulated by the deformity or relief pattern on the surface of said detector. The successive modulated light beams are converted by a suitable light-sensitive member such as photomultiplier or phototransistor or television pickup tube into electrical signals which serve to reproduce a visible image or are fed into utilization circuits or devices. As the light beam has almost no noise, the light photon noise being negligible, my device exhibits a much greater sensitivity than the devices of the prior art.

The modulation of the readout beam in my device occurs by interferometric changes in the reflected or transmitted readout light beams when they are recombined together after the irradiation of the image detector as it is described in detail later. This novel construction should not be mistaken for devices using modulation of the light beam caused by changes of reflectivity or transparency of the examined object and in which no interferometric interaction of light beams occurs.

The invention will be better understood when taken in combination with accompanying drawings.

IN THE DRAWINGS

FIG. 2A, shows a multicell infrared-sensitive image detector.

FIG. 2B, shows a detailed view of infrared sensitive gas cell.

FIG. 4, shows an imaging system using reflected light beam readout with phase modulation.

FIG. 5, shows imaging system using an electrostatic image detector with light beam readout.

FIGS. 5A, 5B, and 5C show modifications of electrostatic image detector.

FIG. 6, shows an electron microscope using light beam readout.

FIG. 6A, shows photoemissive imaging device using light beam readout with optical modulation of light beam.

FIG. 6B, shows a photoconductive imaging device using light beam readout with optical modulation of said light beam.

FIGS. 6C and 6D show gamma or neutron cameras using light beam readout with optical modulation of said light beam.

FIG. 6E, shows a modification of an infrared imaging system using an array of electrical conductors.

FIG. 7A, shows a modification of infrared imaging system using an array of electrical conductors.

FIG. 7B, shows a modification of supersonic imaging system using an array of electrical conductors.

FIG. 7C, shows a modification of gamma or neutron imaging device using an array of electrical conductors.

FIG. 8, shows a modification of imaging system using field illumination type of light beam readout system with optical modulation of said beam.

FIG. 9, shows signal detector.

FIG. 9A, shows a signal-detecting device.

Figure 1:
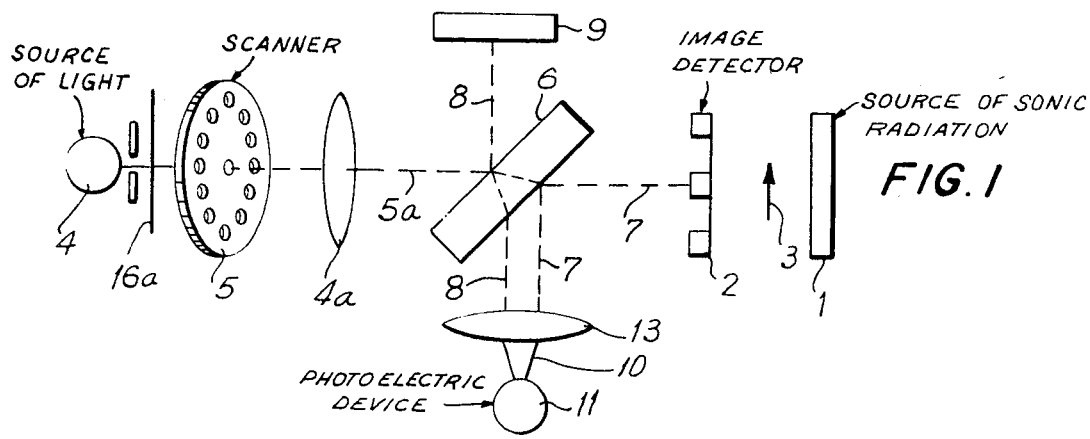
FIG. 1, represents supersonic imaging system using reflected light beam readout with interferometric modulation.

FIG. 1 shows the supersonic or sonic-radiation-sensitive imaging system. The sonic radiation is generated by the source 1, which may be of piezoelectric elements such as quartz, or titanates or other ceramic materials, or of magnetostrictive or electrostrictive type or of evaporated type such as CdS or ZnO or of hydrophone type. It should be understood that all types of generators of supersonic waves may be used for my device. The beam of sonic radiation either of scanning type or of a field type is focused by suitable acoustic lenses or mirrors on the examined object 3 or area. The transmitted or reflected radiation returns to the piezoelectric image detector 2. The detector may be a separate unit from the generator of sonic radiation if a transmitted beam is used. In other cases when using a radiation reflected from the object the detector and generator may be the same unit. The piezoelectric detector 2 may be in the form of a mosaic of separate elements or may be a continuous layer if made of a dielectric material. It was found however that a mosaic type comprising a plurality of separate elements produces better results. The sonic detector 2 may be of crystalline type or of polycrystalline ceramic or of evaporated type such as of CdS or of ZnO. It should be understood that my device can use all types of sonic waves such as longitudinal, shear, lamb or raleigh waves. All these sonic waves will produce in the detector 2 the inverse piezoelectric effect which will manifest itself by contraction or expansion of the image detector 2. This pattern of expansions or contractions can be read out by the novel device which comprises a source of monochromatic radiation such a laser 4.

It should be understood that in some cases instead of the laser a conventional light source but provided with monochromatic filters may be used but the results will be much inferior to the system using laser radiation. It was found that use of laser beam for the readout permits detection of much smaller deformities or optical changes that was possible by the use of standard sources of monochromatic light and allows therefore a much better sensitivity of all imaging devices and systems. The laser 4 may be of gas type such as Ne-He or of argon, or it may be of solid type such as of ruby, or it may be of molecular type such as $CO_2$ or it may be of a chemical type. It should be understood that all types of lasers which produce monochromatic radiation may be used in my device. The monochromaticity of laser beam may be further improved by using narrow band optical filters 16a mounted between the laser and the detector 2. The light produced by laser 4 should be a parallel beam and of wavelength to which the photoelectric device 11 is sensitive. The laser beam is usually produced in pulses. It was found however that better monochromaticity of the light beam will be obtained when using a continuous output of laser, known also as C.W. type of laser operation. The laser beam has to be transformed now into a scanning beam of light. This is accomplished by a scanner 5. The light scanner may be of any type known in the art such as rotating disc or drum provided with apertures or lenses, oscillating, rotating or nutating mirrors or prisms or fiberoptic devices. The scanning light beam 5a produced by the scanner 5 scans the detector 2 in a television raster fashion. The scanning light beam 5a has to pass on the way to detector 2 through the optical device 6 which splits each scanning beam into two symmetrical beams 7 and 8. The optical device 6 may be in the form of a parallel surface plate which is 50 percent light reflecting and 50 percent light transmitting. In some cases the parallel plate beam splitter 6 does not have to be coated on one surface with 50 percent light-reflecting and 50 percent light-transmitting coating because reflection of the laser beam is obtained by projecting it onto element 6 at Brewster's angle. In case the beams 7 and 8 are of polarized type as it is the case when using a laser beam a birefringent plate can be used for the optical member 6. It should be understood that instead of a parallel plate which is half reflecting and half transmitting for the readout light we may use any other beam dividers such as made of a long 45°—90° prism sawed into two parts and reassembled after one hypotenuse surface has been coated with a 50 percent reflecting and 50 percent light-transmitting surface. Many other devices are known for this purpose in the art and may be used in this invention. It should be understood that all known modifications of the beam-splitting optical member 6 may be used for the purpose of this invention. One split scanning beam 7 is focused on the surface of the detector 2 and is reflected by it. Any change of relief of the surface of the image detector will modulate the light beam 7. Another split beam 8 is projected onto an optical reference member 9 which is mounted at the same distance from the optical member 6 as the surface of the detector 2. The light beam 8 is reflected by the optical reference member 9. Both beams 7 and 8 are now recombined. If the surface of the detector 2 presented to the light beam 7 shows an expansion or contraction, the length of the path of the beam 7 will be different from the length of the path of the beam 8 and both beams 7 and 8 upon their recombination will exhibit interference effects which will cause a partial strengthening or extinction of the light. The recombined light beam 10 is projected or focused by lens 13 onto a light-sensitive photoelectric device 11 such as photomultiplier or phototransistor or television pickup tube. The photoelectric device 11 converts the received successive light beams 10 which represents individual image points into electrical signals which are proportional to the strength of said light beams 10. It follows therefore that all changes in the surface relief of the detector 2 will be translated into interferometric changes of intensities of readout light beam 10 and will be converted into electrical signals or various energy which will serve to reproduce a visible image or will serve in other utilization means. There are many methods to produce two light beams for the purpose of interferometric analysis. In some instances the reference mirror 9 may be eliminated and the reference beam 8 may be produced by the image detector 2 itself.

In some cases instead of splitting the beam 5a into the beams 7 and 8, a phase contrast system may be used. In this modification of my invention the reflected beam 7 which met an area of expansion on the surface of the detector 4 will be upon reflection of a different phase than the reflected reference beam 8. As the human eye cannot see the differences in phase, this difference must be translated into an amplitude difference. This is accomplished by means of a phase plate or diffraction grid, as it will be explained in detail later.

The photoelectric device 11 produces the electrical signals of the strength sufficient to activate a display device which may be a kinescope or a kinescope provided with a storage target or with a persistent phosphor screen or with ionic type of screen such as alkali halides. Also a solid-state type of display device such as an electroluminescent screen or electroluminescent screen in combination with ferroelectric circuits may be used. Also an array of light-emitting diodes such as of GaAs or of GaP type may be used for a display device. It should be understood that all types of display devices may be used for the purpose of this invention.

The kinescope may be of a storage type such as manufactured by Hughes Co. and named "Tonotron." It is also intended to use a storage tube for electrical signals prior to their conversion into visible image. Such tubes are manufactured for example by Raytheon Co. and named "Kiloton" and will be suitable for this purpose.

In conclusion my device has a much greater sensitivity than the devices of the prior art as there is no need anymore for an electron beam to produce a readout of the invisible image and the main source of the noise is therefore eliminated. In addition the dark current of the image detector is of no concern anymore as it cannot affect the light beam and cannot appear in video signals.

It should be understood that the readout light beam instead of being reflected by the image detector 2 or all modifications of image detectors, may be transmitted through said image detector. In such cases the image detector must be a light-transparent image-detecting member. In piezoelectric detectors 2 quartz will be a suitable material.

In some cases the devices using a transmitted readout light beam may be used without the optical beam divider 6. The reference beam will be derived from the image detector itself. In some applications the optical path difference between the readout light beam and reference light beam may be enlarged by the use of a phase plate as it will be described in detail later.

It should be understood that supersonic image device may use all image detectors and all light readout devices described or illustrated in this specification.

In case the sonic generator is of scanning type, there must be provided a synchronization circuit between scanner 5 and the sonic generator 1, so that the laser beam 5a will be directed to the element of the image detector 2 which was irradiated by the scanning sonic beam. Synchronization circuits are well known in the art. It is believed therefore that their detailed description is not necessary.

It should be understood that the device shown in FIG. 1, may operate with a sonic generator of field irradiation type which means of a nonscanning type such as irradiating simultaneously the whole examined object or area.

It should be understood that the device shown in FIG. 1 may be used for reproduction of infrared images or X-ray images or atomic particles images or other images produced by a reflected or transmitted radiation by substituting a suitable image detector for the detector 2.

Figure 2:
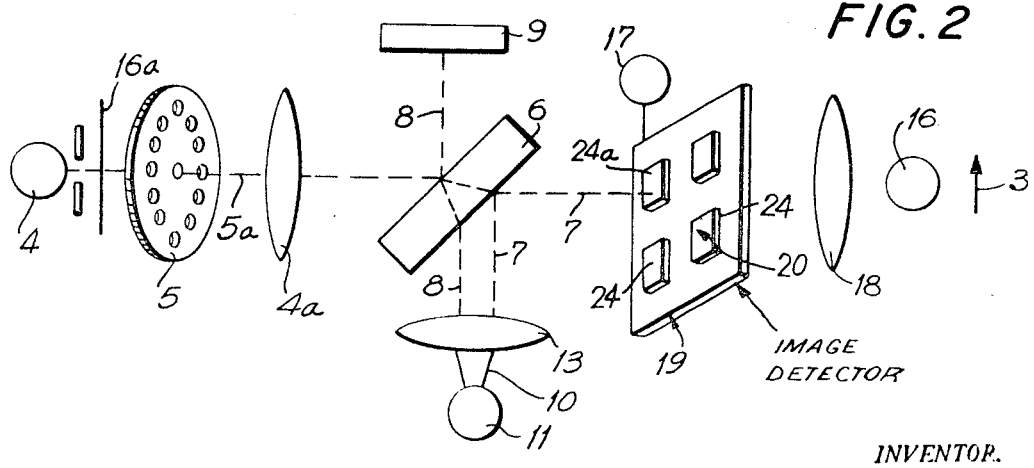
FIG. 2, shows infrared or radar imaging system using reflected light beam readout with interferometric modulation.

The imaging devices described above were found to be useful for infrared or microwaves or radar images which are formed not only by a transmitted radiation as shown in FIG. 1, but also by a reflected radiation. Such device is shown in FIG. 2. The irradiation which means illumination of the examined object 3 or area is provided by a source of infrared radiation such as laser 16 of Ne-He type or of $CO_2$ which emits in 10 micron wavelength, or by a conventional source of infrared energy such as black body radiator with suitable filters for the selection of the necessary wavelength, or a source of microwaves. The laser beam is focused by the optical system onto examined object 3. The reflected infrared beam which carries the image is focused by the optical system 18 onto novel infrared image detector 19. The image detector 19 comprises a plurality of individual and identical in size cells 20 which are arranged in a two-dimensional array. This construction using a plurality of detectors cells separated from each other was found to be superior to the construction using one large detector. Each cell 20 will represent one image point and the dimension of the cell 20 will be governed by the resolution of images required. Each cell 20 is filled with the gas which has a good absorption for the infrared rays, e.g. $CO_2$. In some cases it is preferable to provide an infrared-absorbing coating 25 on the inside wall of the cell 20. Black gold or other metals evaporated in hydrogen atmosphere form a good infrared absorber. The support member 26 for all cells 20 has on the side facing the examined object 3 an infrared transparent membrane 23 or plate such as of germanium or silicon or $As_2S_3$, according to the wavelength of infrared used. On the opposite side the cells 20 are closed by an extremely thin membrane 24 formed by aluminum oxide or silicon monoxide or plastics such as polyesters or polyamides or terephthalates or silicon dioxide. The membrane 24 for each of detectors 20 should be preferably coated on the side facing the readout light beam 7 with a very thin light-reflecting layer 24a such as of aluminum or silver of the thickness not exceeding a few hundred Angstroms. It was found that such coating 24a will improve the contrast of images. The membrane 24 may extend over all cells 20 as one continuous unit. It was found however it is preferable that each cell 20 should have its own membrane 24 which is independent and discontinuous from the membrane of the adjacent cells 20. This can be accomplished by evaporating the membranes 24 through a suitable mask on an apertured supporting member such as mesh screen 26 or a screen of bentonite. This construction reduces the inertia of the membrane 24 and improves sensitivity of the device. The impingement of the infrared rays carrying the image onto cells 20 causes expansion of the gas contained in said cells. The expansion of the gas causes expansion of the membranes 24 closing the cells. This deformity of the membranes 24 can be now readout by the scanning light beam 5a as was described above. The monochromatic laser source 4 produces a beam which is converted into a scanning beam by the scanner 5a. The scanning beam 5a is split by the beam divider 6 and the split beam 7 scans the infrared detector 19 and its cells 20 in the television raster fashion. The beam 7 is influenced by the deformity of the membranes 24. The reflected beam 7 when recombined with the beam 8 will cause light interference effects as was explained above and which correspond to the deformity of the membranes 24. This interference effect will manifest itself by changes of light intensity which will be picked up successively by the photoelectric member 11 and transformed into electrical signals. The resulting electrical signals will be fed into display devices or other utilization circuits as was explained above.

FIG. 2A shows another view of the infrared detector 19. It was found that the contrast of readout images will be improved by coating the membrane 24 with a thin uniform light-reflecting layer such as of aluminum or silver 24a and that such layer should not exceed the thickness of a few hundred Angstroms. It was found that it is important that the reflectivity of the layer 24a be matched with the reflectivity of the reference optical member 9 or 9a. The intensity of the readout light beam 7 reflected from the image detector in the absence of any image and the intensity of the reference beam 8 reflected from the optical reference member 9 must be equal to each other. If the size of beams 7 and 8 are not equal or if their intensity for any other reason is not equal in the absence of any image, their energy may be equalized by adjusting the reflectivity of the layer 24a or of the reflecting layer on the optical member 9 or its modifications to compensate for any such differences. This construction applies to all embodiments of invention.

It was furthermore found that the main requirement for a good image detector 19 is a perfect thermal insulation of each cell 20 from an adjacent one. This was accomplished by using for the perforated support or matrix 26 a material which is the best heat insulator; silicon oxide and ceramics were found to be suitable for this purpose. It was found that naturally occuring clay material known as bentonite is provided with a multitude of small openings which can be used to form cells 20 and that it also has thermal insulation characteristics suitable for the purpose of this invention.

As was explained above the readout light beam 7 should be not absorbed at all by the image detector 19, but reflected completely. In some cases it is advisable to increase the sensitivity of the infrared image detector 19 by preheating the cells 20. Care is to be exercised that such heating will not cause deformity of the membrane 24 which will be shown by the imaging device in the absence of the image-forming radiation. It means that heating means 17 should supply at least the amount of heat radiated by the detector 19 away when its temperature is raised by image-forming radiation.

If the imaging device uses a transmitted type of light readout, the image detector 19 must be transparent to said light. Silicon oxides and plastics described above, are light transparent and are also infrared transparent and are suitable for this purpose. It should be understood that infrared imaging device may use all image detectors and all readout systems described in specification.

It should be understood the infrared image may be also formed by a self-emitted infrared radiation from the examined object or area or may be formed by a radiation transmitted through an examined object or area.

It should be understood that instead of image detector 19 other infrared-sensitive detectors may be used. In particular the detector 92 comprises a photoconductive layer 86 and a deformable membrane 24 or 88 or their modifications which are shown in FIG. 2B or FIG. 6B and described in detail below.

The photoconductive layer 86 may be in the form of a two-dimensional array of separate thermocouples or bolometers. Each thermocouple or bolometer of thermistor corresponds one image point and produces electrical charges corresponding to the intensity of said image point.

Instead of detectors 19 and 92 other infrared-sensitive detectors may be used. In particular organic materials such as cholesteric liquid crystals and glycine show changes of index of refraction upon irradiation by infrared or microwaves and may be used for all infrared image detectors described in this specification.

In the prior art there are described many devices in which the image is converted into a beam of electrons or other atomic particles or in which the image originated as such a beam. It was found that the sensitivity of such devices can be improved by using a novel multielement image detector 40 which is shown in FIG. 5. The image detector 40 comprises a multicellular structure 41 such as a mesh screen or a perforated plate of a dielectric or semiconducting material such as glass or a very thin layer of bentonite. On one side of the member 41 which receives the image-carrying electron beam emitted by the photocathode or electrode 42, there is evaporated through a suitable mask a two-dimensional mosaic of membranes 43 of dielectric material or of semiconducting material such as aluminum oxide, silicon oxide or magnesium oxide suitably doped. The membranes 43 are deposited in such a manner that each membrane occludes one opening 43a in said member 41. The electron beam is decelerated so that it lands on the membranes 43 with a velocity close to zero and deposits on it its negative charges. The membranes 43 should be as thin as possible and the thickness of 100 A. will be preferable for the purpose of this invention. In any event the thickness of the membranes should not exceed a fraction of 1 micron. In some cases, it is necessary to use the electron beam 48 of a high velocity which will cause secondary electron emission from the membranes 43. According to velocity of the electron beam, the emission may be greater than unity. In such case a positive charge will be formed on the membranes 43. In other cases, the emission of secondary electrons may be smaller than unity and in such case a negative charge will be formed on membranes 43.

Spaced apart from the member 41, there is provided an electrically conducting membrane 44 which may be of silver or other metals and which is transparent to the readout light 7. Preferably it may be of a light-transparent dielectric material such as silicon oxide, glass or a suitable plastic such as polyester or polyamide which is coated with a very thin light-transparent electrically conducting layer such as of silver or other metals or with tin oxide. The membrane 44 is connected to the source of electrical potential and may be provided with a negative or positive potential according to the application. The electrical charges on the membranes 43 and on 44 if they are of the same polarity will exert electrostatic repulsion. If of opposite polarity, they will exert electrostatic attraction. The member 44 is mounted in a taut manner and therefore will not deform. The membranes 43 are mounted to have a free surface and can be therefore deformed by electrostatic forces. These deformities of membranes 43 may be readout by the novel interferometric light readout device as was described above. The readout device may operate using either deformity of attraction type or a deformity of repulsion type.

It should be understood that membranes 43 may be mounted on the support 41 on either side of said support. If they are mounted on the side of the support 41 which is closer to the membrane 44, the thickness of the supporting member is not critical anymore. On the other hand if the membranes 43 are mounted on the side of the support which is further away from the membrane 44, than the thickness of the supporting member is critical and should not exceed 10 microns. The supporting member 41 is connected to the ground. It should be understood that the membrane 44 may be self-supporting or it may be mounted on the supporting member 41 on the side opposite to one in which membranes 43 are mounted. This is shown in FIG. 5A which illustrates image detector 40a. In this construction the supporting member 41 should be as thin as possible and its thickness should not exceed 10 microns. The membrane 44 may be of continuous type or of mosaic type comprising a plurality of independent separated membranes, as was explained for the membranes 43. The mosaic type is preferred if the light readout is performed from deformities of the membrane 44 instead of from membranes 43. In this case the membranes 43 may be sometimes of continuous type instead of mosaic type. In such case the membrane 43 may be mounted on a continuous support instead of a perforated support 41 and may be also made much thicker than in the image detector 40. The membranes 43 will therefore not deform when receiving the beam of electrons or charges representing the image. On the other hand the membranes 44 or 44a are mounted on the perforated support 41a and are now made as thin as possible so that they may deform freely under the influence of electrostatic forces described above. The thickness of membranes 44 or 44a in this construction should not exceed a fraction of 1 micron. The membranes 44 or 44a are in this embodiment of invention coated on the side which is receiving the readout light beam 7 with a light-reflecting layer such as of silver. As the readout it now performed from the membrane 44 or 44a there is no need anymore for the transparency of said membranes 44 or 44a.

In some cases both membranes 43 and 44a may be of mosaic type and mounted on separate perforated supporting members 41a. This is shown in FIG. 5B which illustrates the novel image detector 40b. Such array of membranes 43 and 44a may be produced by evaporation through a suitable mask. In some cases the image detector 40 may be simplified as shown in FIG. C which illustrates the novel detector 40c. The detector 40c comprises a continuous single membrane 50 which may be of semiconducting or dielectric materials described above for membranes 43a but which is self-supporting. Opposite to the membrane 50 and in parallel relationship to it is mounted a continuous electrically conducting membrane 51c which may be of silver or other metals or of a dielectric material such as aluminum oxide or silicon oxide or a suitable plastic such as polyester or polyamide which is coated with an electrically conducting layer such as of silver or of other metals or with light-transparent tin oxide. The membrane 51 may be highly reflecting for the light used for the readout if the readout is performed from deformities of membrane 51. It should be light-transparent if the readout is performed from deformities of membrane 50. The spacing of the membranes 50 and 51 is very critical and cannot exceed the distance of 10 microns. The electrically conducting membrane 51 is connected to the source of electrical current and receives the electrical charges which may be of the same sign as the electrical charges produced in the membrane 50 by impingement on it of the beam of particles which carries the image or of the opposite sign.

The electrical charges on the membrane 50 will leak away in a desired time by using a semiconducting material of proper resistivity. If a dielectric material is used for the membrane 50, the charges must be removed by spraying the membrane after the readout with a beam of particles of opposite sign than the charged image.

The value of electrostatic image detector having a light-transparent membrane 44 or its modifications resides in discovery that such device has a greater sensitivity. A small electrical charge on the membrane 43 or their modifications will be acted upon by many times greater electrical charges on membrane 44 or its modifications. The electrical charge on membrane 44 is not limited by the strength of the imaging radiation as it receives its electrical charges from an external source of electrical power. Therefore the membranes 43 having a small electrical charge produced by the image radiation will be acted upon by a much greater charge deposited on the membrane 44. In this modification of invention, the membrane 44 may be in some cases replaced with a light-transparent plate 2d which comprises a two-dimensional array of electrical conductors 2c and a light-transparent electrically conducting layer 36a which are shown in FIG. 7B. The layer 36a is connected to the source of electrical power and delivers the electrical charges to the free ends of the conductors 2c which permits electrical charges in desired points and to eliminate electrical crosstalk. The above described construction of the membrane 44 using a plate 2d applies to all electrostatic image detectors described in specification.

In conclusion the impingement of the electron or other particles beam 48 which carries the image on the membranes 43 produces a negative or a positive charge image on said membranes which is a replica of the original image. The electrically conducting membrane 44 or 44a or their modifications is connected to the source of electrical current 47 and receives electrical charges which may be of the same or opposite sign as the electrical charges on the membranes 43 or their modifications. The electrostatic repulsion of charges of the same polarity or attraction of charges of the opposite polarity will cause motion of the membranes 43 or their modifications or membrane 44, 44a, or 51 or their modifications. This motion will cause a minute deformity of the surface of said membranes. These deformities of the surface can be read out by means of a laser beam or other monochromatic light beam as was explained above.

In some cases it is preferable to provide electrical charges to member 44 or its modifications by means of an electron gun or other source 84 of atomic particles. Electron gun 84 may be mounted obliquely so that it will not obstruct light beam, as shown in FIG. 5. The source of particles 84 deposits negative charges or positive charges on the membrane 44. The membrane 44 is of semiconducting material such as glass or MgO suitably doped. If the readout is done through membrane 44 it must be transparent to the readout light beam. If the readout is done from the side of membrane 43 which is facing the light beam the membrane 44 does not have to be transparent to said light. The deposited charges on the membrane 44 migrate to the opposite side of the membrane 44 where they exert electrostatic forces on the membrane 43, as was explained above.

It should be understood that the above-described electrical charging of membrane 44 or its modifications with electrons or other ionized particles applies to all embodiments of invention such as but not limited to membranes 88, 91 and others described above.

It should be understood that all modifications of the light readout system described in combination with all image detectors of electrostatic type such as 40, 40b, 40c may be used for the purposes of this invention. It should be also understood that all imaging or signal devices described may use electrostatic image detectors such as 40, 40b, 40c or 40e and their modifications instead of other image detectors.

It was found that in some applications the readout light beam 7 must be normal which means perpendicular to the surface of the image detector 2, 19, 40 or all modifications. This problem was solved by using an optical system disposed between the scanner 5 and the image detector which corrects the divergent light beams 5a delivered successively by the scanner 5 into normal light beams.

It was found that a simplified solution of producing the normal light beams emerging from the scanner 5, is in constructing the image detector 2, 19, 40, 40a or their modifications having a curved shape of the surface which is impinged by said light beams. The curved shape is designed in such a manner that each of the scanning light beams will arrive at it at the normal incidence. The radius of the curvature of the surface of the image detector will depend on the distance of the light source from the image detector and on separation of image points from each other, which again depends on resolution necessary for images. Further improvement of this device will be obtained by making the reference optical element 9 also of a curved shape to provide a surface which will be normal to the split reference light beams 8 at each point of their incidence. It should be understood that the curvature of the optical member 9 and of the surface of the image detector 2, 19, 40, 40a and all modifications should match each other, so that both split light beams will travel the same distance to their respective destinations. It should be understood that only one surface of the image detector 40, 40a or its modifications has to be curved to obtain normal incidence of the readout light beams. The other surface may be plane or may be of any other shape. A suitable construction for producing a curved image detector is to use a curved mesh screen and to evaporate the membranes on its surface as it was described above. It should be understood that all construction which provide for a normal incidence of the light beams on the image detector and on the reference optical member represent an important feature of this invention and they may be used in all embodiments of invention.

Figure 3:
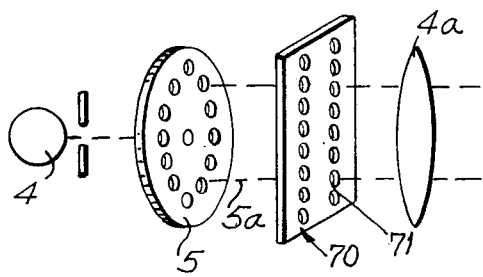
FIG. 3, shows a modification of the light readout system using a pinhole array plate.

The normal incidence of the readout light beam may be also obtained by using a screen 70 comprising a two-dimensional array of pinholes 71 corresponding to the array of individual image point detectors in the image detector 2, 19, 40, 40a or all modifications. The pinhole screen 70 is mounted in a parallel relationship to the surface of the image detector. If the image detector has a flat surface, the screen 70 will have also a plane construction. If the image detector is curved and has a concave surface, the screen 70 will be also curved and parallel to said concave surface. The screen 70 is light opaque between the pinholes 71. In this construction shown in FIG. 3 successive light beams produced by the light source 4 pass through the pinholes 71 and the emerging light beams are normal in relation to the image detector because oblique rays will not pass through the pinholes.

In some cases the source 4 of monochromatic radiation may be a kinescope provided with monochromatic filters. In such case the pinhole screen 70 may be mounted on the outside surface of the end wall of the kinescope. In some cases, it may be mounted on the inside surface of said end wall and be adjacent to or in contact with the phosphor screen of the kinescope. In some applications the pinhole screen may be spaced apart from the kinescope and be mounted between the kinescope and the image detector.

Figure 3A:
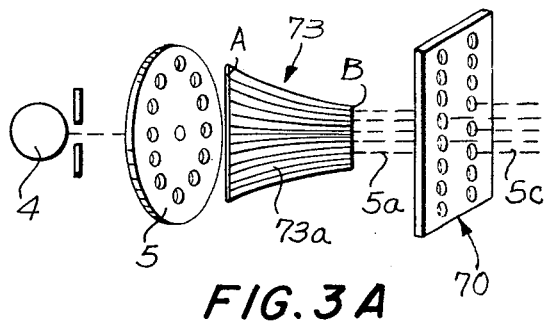
FIG. 3A, shows a modification of the light readout system using a fiberoptic bundle.

Instead of a pinhole screen, other optical elements may be used in an array form for this purpose. In one modification of the invention a two-dimensional array of miniature prisms or glass balls may be mounted on the end wall of the kinescope and will transmit the light rays produced by the phosphor screen in a very narrow cone so that transmitted light beams will be essentially normal to the image detector. Another modification of the invention is shown in FIG. 3A. In this embodiment the normal scanning readout light beams are produced by using a fiberoptic bundle 73 which comprises a two-dimensional array of fibers 73a operating by internal reflection of light. Each fiber is made of glass, quartz or plastic and has a high index of refraction. Each fiber is coated with a light-transparent or light-opaque coating of material having the index of refraction lower than said fibers. In some cases said coating comprises two layers, one being a light-transparent coating of a lower index of refraction and another one being a light-reflecting coating such as aluminum or silver. The monochromatic light from the laser or other source 4 such as mercury arc is projected onto scanner 5. The successive scanning light beams are focused on the end face A of said fiberoptic bundle 73. Each light beam lands on the end face A of one fiber 73a. The bundle may have a tapered shape to accommodate for the difference between the size of the scanner 5 and of the image detector 2, 19, 40, 40a or all modifications. The end face B of the bundle 73 is mounted parallel in relation to the image detector and each fiber 73a at the end face B is directed normally to the surface of said image detector. It follows therefore that all scanning light beams will be delivered to the image detector with a normal incidence. In order to prevent the spreading of the light beams emerging from the fibers end face B, a pinhole screen 70 which was described above may be mounted between said end face B and said image detector in close apposition or in contact with end face B. In some cases may be necessary to mount pinhole screen 70 also between the scanner 5 and the end face A of the fiber bundle 73. In some cases the end face A of the bundle 73 should have a circular shape, whereas the end face B may be linear. This will be preferable in using a scanner which produces only a line of scanning. In such case the vertical scanning must be provided by the motion of the image detector 2, 19, 40 or all modifications or by the use of another optical member such as oscillating or nutating mirror.

In some cases the optical means 6 for splitting the scanning light beam 5a or for retardation of the readout light beam may be eliminated and the reference light beam may be derived from the beam reflected by the surface of the image detector 2, 19, 40 or all its modifications. In such case the plate 70 is coated with a film on the side facing the image detector which is half reflecting and half transmitting to the light so that it will pass the scanning light beams 5a through the pinholes 71 to the image detector. The pinhole plate 70 may be positioned at an angle in relation to the surface of the image detector. The image detector surface is mounted at a small angle to the normal readout light beam 7. Therefore, each scanning readout beam upon reflection from said surface will comprise two separate beams. The pinhole plate 70 because of its film reflects both of them into direction of the photosensitive or photoelectric device such as phototube or phototransistor 11. Both reflected beams are recombined before they are projected onto said photoelectric device as was explained above. It should be understood that this modification in which the optical member 6 is eliminated or in which the reference optical beam is derived from the image detector itself applies to all embodiments of invention.

It should be understood that instead of or in addition to interferometric systems described above, I may use also a phase contrast system for all visible or invisible radiation images described above. The photoelectric materials are not responsive to phase changes of the light and it is necessary therefore to translate said phase changes into amplitude changes before their conversion into electrical signals or into a meaningful image. This embodiment of invention is shown in FIG. 4 which illustrates device 75 for a reflected type of readout. The source of monochromatic radiation 4 may be the same as described above. The scanner 5 may be the same as described above. The pinhole array plate 70 may be the same as described above and may be mounted between the source 4 and condenser lens 4a. The scanning readout light beam 5a passes through the apertures 71 which serve as the annular stops and through the half-transparent and half-reflecting optical member 76 and impinges normally on the surface of the image detector 2, 19, 40, 40a or all their modifications. A part of readout beam 7 is reflected without being modulated by the deformity or relief pattern on the surface of said image detector. Another part of said readout beam 7 is modulated by deformity or relief pattern on said surface of the image detector. Both modulated and nonmodulated beams are reflected onto the plate 76 and are reflected by it. Both reflected beams 7a and 7b from said plate are now focused onto phase or diffraction plate 77. The phase plate serves to retard or to advance the wave front of the light and is used to create or enlarge the difference of the optical path for the impinging light waves. There are many constructions of such phase plates which are well known in the art and it is believed therefore that their detailed description is not necessary as it is given in the standard books on optics. It should be understood that some phase plates transmit nonmodulated which means not diffracted light beam whereas they retard the modulated light beam. Other phase plates operate in the opposite manner and transmit without retardation the modulated which means diffracted light beam, whereas they do not affect the nonmodulated light beam. Instead of phase plates, other devices such as diffraction grids may be used for the purpose of this invention. Whatever device is used to increase the difference of the optical path or phase between the modulated and nonmodulated reflected light beams, the final results will be their mutual interference upon their recombination. This interference effect as was described above will lead either to the increase of brightness or to a decrease of brightness of the respective combination of light beams, it means of the respective image points. The recombined light beam 10 is projected onto a photosensitive device such as photographic film or photoelectric device 11 such as phototube or phototransistor and will be converted into electrical signals or an image as was described above.

Figure 3B:
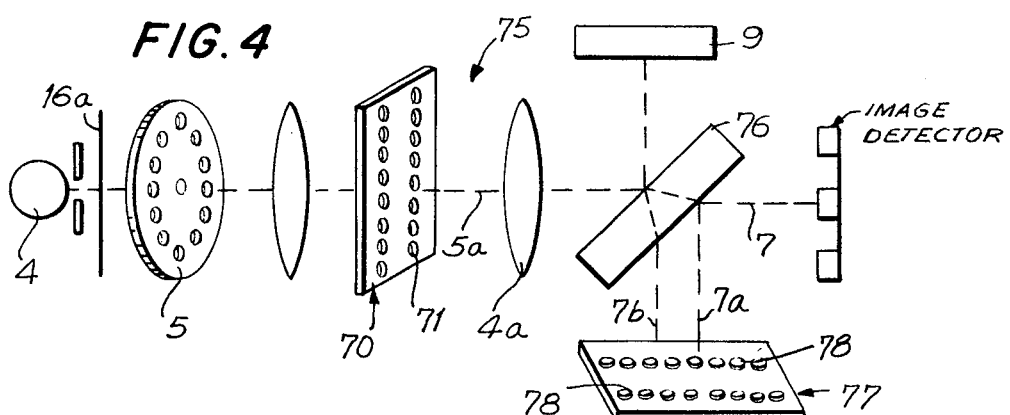
FIG. 3B, shows a plate with two-dimensional array of phase elements.

It was found that in some cases instead of using a standard phase plate, it is preferable to use a phase plate 77 which is constructed in the form of a two-dimensional array of diffracting or phase-shifting elements 78 as it is shown in FIG. 3B. The array of diffracting elements 78 is made by evaporating through a suitable mask a metal and will transmit 7 to 20 percent of light. The element 78 may also be constructed by evaporating a dielectric material such as $MgF_2$ which will result into an opposite phase effect. The standard diffraction or phase plates use only one light-transmitting or light-retarding element 78.

The pinhole plate 70 serves as the annular diaphragm, and pinhole apertures serve as annular stops. In some cases an optical reference member 9 may be provided for reflecting the image of the annular stop onto the phase element 78. In some cases a focusing lens may be mounted before the phase plate 77 in order to image pinhole aperture 71 onto the phase-shifting elements 78.

The use of the novel multielement phase or of diffraction plate 77 facilitates the use of readout light beam of field illumination type instead of a scanning readout light beam. In some cases it is necessary to use in addition cylindrical lenses 80 mounted between the phase plate 77 and the photosensitive or photoelectric device 11.

In some cases the optical member 76 may be eliminated and the plate 71 is modified to replace it. The plate member 71 is then coated on the side facing the image detector with a film which is half reflecting and half transmitting for the readout light.

It should be understood that the above described reflected phase contrast device may be converted into a device operating by the use of a transmitted readout light beam instead of a reflected light beam. This embodiment is shown in FIG. 4B which illustrates device 75a. This embodiment will be useful for image detectors which respond to the image-forming radiation by small changes of their index of refraction or optical density. The image detector in this device must be transparent to monochromatic radiation used for readout and detectors 2, 19, 40 and all their modifications must be modified by using light-transparent materials as was explained above.

Besides piezoelectric materials which change their index of refraction when exposed to supersonic radiation, other materials exhibit such effects when subjected to various radiations or pressures. Such materials are cholesteric liquid crystals glycine or birefringent materials and it should be understood that all such materials may be used for the purposes of this invention.

Figure 4A:
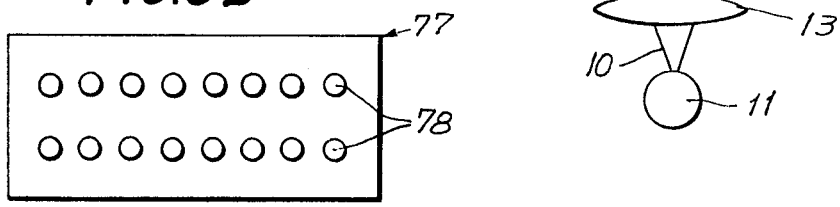
FIG. 4A, shows imaging system using transmitted light beam readout with phase modulation.
Figure 4A:
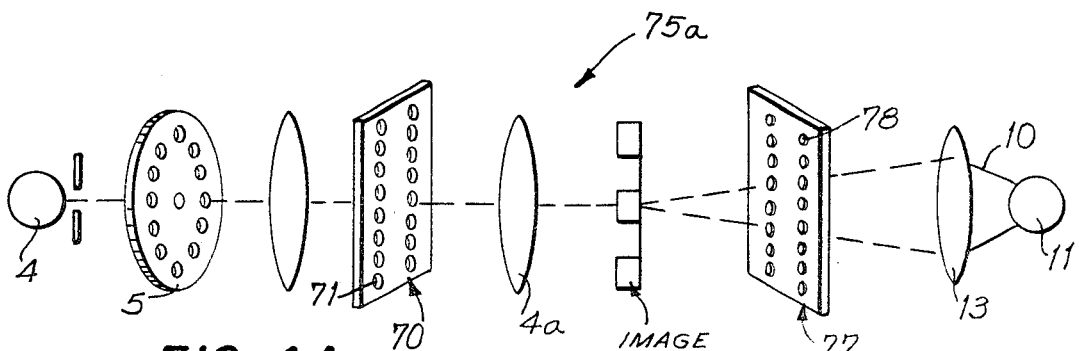

This embodiment of invention for phase contrast is shown in FIG. 4A which illustrates the device 75a for a transmitted light type of readout. The source of monochromatic light 4 may be the same as described above and the radiation will be selected which is transmitted by the image detector used. The scanner 5 may be the same as described above. The pinhole array plate 70 may be the same as described above. The scanning readout light beam 5a passes through the apertures 71 and impinges normally on the surface or the image detector 2, 19, 40, 40a and all their modifications. A part of said readout beam is transmitted without being modulated which means diffracted by the changes of the index of refraction of said image detector. Another part of said transmitted readout beam is modulated by said changes of the index of refraction in said image detector. Both modulated and nonmodulated transmitted beams are focused into the phase plate 77 and one of said beams is retarded by said plate. Instead of phase plates, other devices such as diffraction grids may be used for the purpose of this invention. Whatever device is used to increase the difference of the phase between the modulated and nonmodulated light beam, the final result will be their mutual interference upon their recombination. This interference effect as was described above will lead either to the increase of brightness or to a decrease of brightness of the respective combination of light beams, it means, of the respective image points. The recombined light beam 10 is projected onto a photosensitive device such as photographic or xerographic plate or a photoelectric device such as image tube or television pickup tube or phototube or phototransistor 11 as was described above.

It should be understood that this embodiment of invention may be modified by mounting in addition the optical reference member 9 and half-reflecting and half-transmitting member 76 or modified plate 71 as was described above. The nonmodulated light beam will be reflected by the member 9 and will be directed to recombine with the modulated light beam in the same manner as it was described above.

The optical reference member 9 may be also mounted coaxially and normally to the readout light beam behind the image detector. In such case the readout light beam will be reflected back to image detector and will therefore pass through it twice which will increase modulation of said readout beam and increase sensitivity of the entire device.

The device 75 and 75a may also operate with a readout light beam of field illumination type instead of a scanning readout light beam. In such case the scanner 5 is omitted.

It should be understood that all devices described may use a reflected readout light beam or a transmitted readout light beam. This will depend on the type of the image detector used and on the particular examination. The light-opaque image detector must use a reflected readout light beam. On the other hand a light-transparent image detector may use either a reflected readout light beam or a transmitted readout light beam. The configuration of the system using a transmitted readout light beam may be preferable in some cases to the configuration which is necessary for the reflected readout light beam.

Figure 1A:
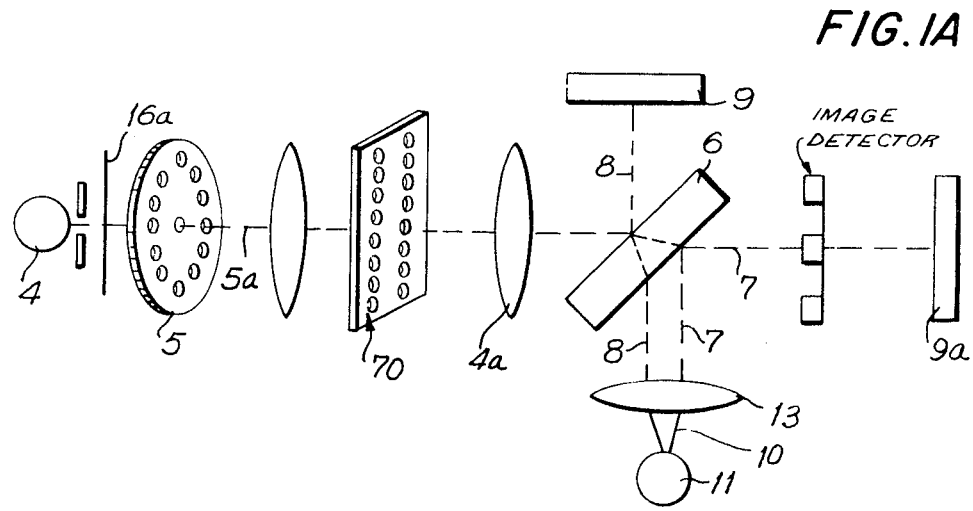
FIG. 1A, represents an imaging system using transmitted light beam readout with interferometric modulation.

The device using a transmitted readout light beam for interferometric type of operation only is shown in FIG. 1A. The source 4 of monochromatic radiation, the scanner 5, the aperture plate 70, condenser lens 4a, the optical-beam-splitting member 6, the optical reference member 9 and all modifications of aforesaid elements may be the same as is described in this specification. The image detectors 2, 19, 40 and all their modifications have to be modified to render them transparent to the readout light.

In piezoelectric detectors 2 quartz will be a suitable material. In electrostatic detectors the membranes which will transmit the readout light may be made of silicone oxide or of light-transparent plastic such as polyesters or polyamides or of "-Mylar." In case a conducting membrane is needed, one of the above-mentioned materials may be coated with a light-transparent tim oxide or cadmium oxide.

The scanning light beam 7 passes through the image detector 2 or 19 and is modulated by the changes of its index of refraction or of optical density which are a replica of the original image. The transmitted beam 7 impinges on the optical reference member 9a which should have the same shape and reflectivity and optical polish as the member 9. The transmitted beam 7 is reflected by the reference member 9a onto member 6 and is reflected by the member 6 into direction of the photosensitive or photoelectric device 11. At the same time, reference beam 8 is reflected by the optical member 6 onto optical reference member 9. Beam 8 is reflected by the member 9 also into direction of the photosensitive or photoelectric device 11. Both reflected beams 7 and 8 are recombined.

If the index of refraction of density of the image detector presented to the light beam 7 shows changes, the path of the beam 7 will be different from the length of the path of the reference beam 8 and both beams 7 and 8 upon their recombination will exhibit interference effects which will cause a partial extinction or conversely increase of the light. The recombined light beam 10 is projected onto a light-sensitive device such as photographic film or a photoelectric device 11 such as photomultiplier or phototransistor. The photoelectric device 11 converts the received successive light beams 10 which represents individual image points into electrical signals which are proportional to the strength of said light beam 10. It follows therefore that all changes of the density or of the index of refraction of the image detector will be translated into changes of intensities or recombined light beam 10 and will be converted into electrical signals or various energy which will serve to reproduce a visible image or in other utilization means, as was explained above.

The electrostatic image detectors 40 and all their modifications do not exhibit changes of the index of refraction and their use in a transmitted readout light beam system is for the purpose of configuration which may be necessary in the particular application.

There are other materials which exhibit changes of the index of refraction when subjected to radiations or pressures. Such materials are cholesteric liquid crystals and birefringent materials. It should be understood that all such materials may be used for image or signals described in specification.

In some cases, the scanner 5 may be omitted and the light readout beam may be of field illumination type and not of the scanning type. In such cases, the photoelectric device 11 may be in the form of an image tube or television pickup tube. This embodiment of invention is shown in FIG. 8. The image of the optical changes in the image detector will be produced by any one of interferometric light readout systems described above of reflected or of transmitted readout type.

It should be understood that all image detectors described may be used also in this embodiment of invention. The image, therefore, is in the form of interference fringes. The imaging devices such as image tubes or television pickup tubes cannot use fringes even if they are of different light intensities to produce a meaningful image for the observer. It was found that fringes must be converted first into light sports of various intensity. This was accomplished by means of one or preferably plural positive cylindrical lenses 80 mounted in a two-dimensional array or other similar optical devices and which are placed in a close distance from the focus of the projection lens 80a and which convert all fringes into spots. The spots well represent now individual image points and are focused on the photocathode 81 of the imaging device 82. The imaging device 82 may be of image tube type in which the image is reproduced in the same tube either on a fluorescent screen or on ionic crystal screen or any other image-reproducing device. The device 82 may be also in the form of a television pickup tube in which the image is converted first into the video signals. It should be understood that the imaging device 82 may be of a photoemissive type, a photoconductive type or of photovoltic type and all modifications of such tubes may be used for the purpose of this invention. In this embodiment of invention the storage means for a buildup of the image may be used.

In cases in which imaging devices 82 are used in combination with the scanning readout light beam 5a a similar construction must be used. The scanning readout light devices described above produce fringes successively one after another which represent successive image points. The imaging devices 82 as explained above cannot use the fringes to build up a two-dimensional image.

It was found that all such devices must be provided with positive cylindrical lenses 80 to convert each fringe into a separate spot. In this embodiment of invention storage means are provided in imaging devices 82 or in combination with said devices to permit the buildup of the image from the successive scanning image points. In the scanning readout system instead of an array of cylindrical lenses 80, it is preferable to use a rotating member such as a disc or drum with such lenses or with empty apertures. The rotating disc or drum must be synchronized with the scanner 5. The rotating disc or drum will convert all successive fringes from the readout device into successive light spots and will position these spots on the photosensitive or photoelectrical device 11 in their correct spatial relationship. Storage means should be provided in such device as the image is produced not simultaneously but sequentially point after point. It should be understood that this modification using conversion of fringes into light spots applies to all devices described in this specification and represents an important feature of this invention.

It should be understood that the above-described modification of the invention may be used with a reflected readout light beam as shown in FIG. 8 or with a transmitted readout light beam as was described before. It should also be understood that in this modification the imaging radiation may be used after being reflected from the examined object or area or after being transmitted through the examined object or area; and also, self-emitting imaging radiation may be used for the purpose of this invention.

In some cases instead of a photoelectric imaging device 82, a photosensitive imaging device such as a photographic film or xerographic plate may be used.

In some applications the readout beam 5a does not have to be of scanning type and the scanner 5 may be omitted. In such cases however the image detector 19, 40 or all modifications must move in a television raster fashion to produce an image.

In some cases instead the motion of the image detector, it is preferable to use a scanning image-forming beam for producing the image by irradiating the examined object or area point after point in succession and such construction applies to all embodiments of invention.

All these devices are of value in microscopy using electrons or other atomic particles such as protons or when using ions. One embodiment of this device is shown in FIG. 6. The novel microscope 55 has a source of atomic particles or ions 56 which may be in the form of an electron gun or any other device for producing particles. The beam 56a of particles irradiates the specimen 57. The transmitted or reflected beam 56b which carries the image impinges on one of the image detectors described above such as 19, 40, 40b or 40c or any other and produces therein the deformity of the individual elements of the image detector as was described above. The image detectors are mounted in the vacuum of the envelope of the electron microscope. If detector 19 which is of gas type is used, it has to be modified to be suitable in a vacuum. The walls of said detector 19 must be made vacuumtight. The black-gold-absorbing layer for infrared may be replaced by an electron- or other particles-absorbing layer.

The deformity of the surface of image detectors can be read out by means of a laser beam or other monochromatic light beam as was explained above. This novel electron microscope will permit because of its greater sensitivity reduction of the intensity of the image forming electron beam. It is important to realize that this device will permit the use of electrons of a low velocity such as 10—20 k.v. instead of presently used 100 k.v. or more.

It should be understood that all light readout systems described in this specification may be used in such electron or other particles microscopes.

These devices will be also useful for low light level operation of image tubes or television cameras.

At present all television pickup tubes are limited by the noise of the scanning electron beam. In my devices the reading electron beam is eliminated, is replaced by the interferometric light readout system which results in a much higher sensitivity. FIG. 6A shows such novel photoemissive-type image or television pickup tube. It is similar to the device shown in FIG. 5 but the photoemissive electrode 42 is used now as a photocathode for receiving a light image. It should be understood that the novel tube 84 may use all image detectors responsive to electrons or other particles which are described in this specification and that it may use all light readout systems described in this specification.

The readout may be used for direct image reproduction or for television transmission.

FIG. 6B shows the novel image tube or television pickup tube 85 of photoconductive type for visible or invisible light. The tube 85 has a photoconductive photocathode 86 of materials such as Se, $Sb_2S_3$, PbO, PbS, PbTe or PbSe or of specially prepared germanium or silicon with suitable activators or of titanates such as of barium or niobates. Both aforesaid materials are sensitive to infrared radiation and are provided with suitable activators to modify their resistivity. When using materials of low resistance such as germanium or silicon the layer 86 must be constructed in the form of a mosaic of separate elements mounted on a dielectric support to prevent their mutual short circuiting, and the loss of image. In such cases, it is not practical to use a common electrode 87. The solution of this problem is shown in FIG. 7B.

The photoconductive infrared reactive layer 86 may be also in the form of a two-dimensional array of separate thermocouples or bolometers or thermistors. Each thermocouple or bolometer corresponds to one image point and produces electrical charges according to the intensity of said image point. The electrical bias may be supplied to them in the same manner as was explained above. The photocathode 86 is provided with a light-transparent electrically conducting coating 87 which is connected to a source of electrical power 90. In a very close spacing to the photocathode 86 such as not exceeding 10 microns is mounted a deformable member 91 which may be in the form of a supporting mesh screen 89 coated with a very thin deformable layer 88. The layer or membranes 88 may be of a conducting material such as of one of metals or of a semiconducting material such as suitably prepared MgO, $Al_2O_3$ or $ZnF_2$. The membrane 88 or its support 89 are connected to the source of electrical potential 90. The membrane 88 may be a continuous layer but preferably is in the form of a mosaic of individual and separate elements evaporated over openings of the supporting member 89 so that they will be free to move in response to electrical forces. The deformable member 91 may be constructed by mounting the individual membranes 88 on the support 89 on the side closer to the photocathode 86 or on the opposite side of the supporting member. The thickness of the supporting member 89 and of the membrane 88 is subject to the same critical limitations as was described above for the corresponding parts 41, 41a, 43, 44 and their modifications of the detector 40 and its modifications. In some cases the layer 88 may be self-supporting. The light images produce in the photocathode 86 a pattern of charges or potentials which correspond to said image. The electric forces of said charge or potential pattern exert an influence on the layer 88 because of its close proximity and will cause repulsion or attraction of the membrane 88 according to the polarity of electrical charges on said layers 86 and 88. These deformities of said member 88 may be readout by the monochromatic light beam using any readout system described in this specification and applied for direct image reproduction or for television transmission.

The above described devices are also useful for gamma rays or neutron cameras. This embodiment of invention is illustrated in FIG. 6C which shows such novel photoemissive-type neutron or gamma camera which may be of image tube type with direct reproduction of the image or of television pickup tube type. It is similar to the device shown in FIG. 5 or 6A but the photoemissive electrode 42 is replaced with screen 32. It should be understood that the tube 33 may use all image detectors responsive to atomic particles which are described in this specification and that it may use all light readout systems described in this specification.

FIG. 6D shows the novel image tube or television pickup tube 34 of photoconductive type for gamma or neutron camera. The tube 34 has a photoconductive photocathode 35 of CdS or diamonds. It was found that a great improvement of sensitivity of gamma camera was obtained without a loss of resolution by making the photocathode 35 of separate particles or crystals 35a or CdS or diamond of elongated form so that the long axis of each element 35a will be coaxial with gamma rays beam and will absorb such rays well, whereas the short axis of element 35a will be normal to said gamma beam which will limit the size of each image point. The photocathode 35 is provided with a light-transparent electrically conducting coating 36 which is connected to a source of electrical power. In a very close spacing to the photocathode 35 such as not exceeding 10 microns is mounted a deformable member 91 or its modifications which may be in the form of a supporting mesh screen 89 coated with a very thin deformable layer 88. The layer or membrane 88 may be of a conducting material such as of one of metals or of a semiconducting material such as specially prepared MgO, $Al_2O_3$ or $ZnF_2$. The membrane 88 or its support 89 are connected to the source of electrical potential 90. The membrane 88 may be a continuous layer but preferably is in the form of a mosaic of separate elements evaporated over openings of the supporting member 89 so that they will be free to move in response to electrical forces. In some cases the layer 88 may be self-supporting. The gamma or neutron images produce in the photocathode 35 a pattern of charges or potentials which correspond to said image. The electric forces of said charges or potential pattern exert an influence on the layer 88 because of its close proximity and will cause repulsion or attraction of the membrane 88 according to the polarity of electrical charges on said layers 35a and 88. These deformities of said member 88 may be readout by the monochromatic light beam using any readout system described in this specification and applied for direct image reproduction or for television transmission.

In some cases layer 88 may be mounted on the layer 35a. In such case the membrane 88 must be of a semiconducting material to prevent short circuiting of the charge or potential pattern on the free surface of the layer 35a.

The membrane 88 should be preferably light reflecting on the surface which is receiving the readout light beam 7. If the membrane 88 is of a metal such as silver no further coating is necessary. If it is of semiconducting materials which are not good reflectors, a coating of light reflecting material such as silver may be preferably added.

It should be understood that these novel gamma or neutron image tubes or television pickup tubes may have a vacuum envelope but they can operate well in the air or in a gas atmosphere.

It should be understood that supersonic-sensitive image tube or television pickup may have the construction described for devices 85 or 34 and all their modifications by using instead of the photocathode 86 or 35 radiation-sensitive detector 2 or its modifications described above. In particular, the membrane 88 or its modifications may be mounted on the piezoelectric layer 2b.

A modification of image system reactive to gamma or neutron radiation is shown in FIG. 7C. The image reactive screen 35a and its modifications comprises CdS or diamonds or a combination of fluorescent layer with a photoconductive layer preferably in the form of a mosaic of separate elements or of a continuous layer as was described above.

A two-dimensional array of electrical conductors 2c such as wires imbedded in the dielectric matrix such as of glass or plastic but being free from insulation at both ends is joined to the layer 35a to make an electrical contact with said layer. The impingement of gamma or neutron radiation image on the layer 35a produces therein electrical charges and currents. These currents flow through said conductors 2c to the electrostatic image detector 40 or its modifications. The currents are preferably amplified by individual amplifiers 31 of vacuum or preferably of solid-state type interposed between each of conductors 2c and the image detector 40. Each of electrical conductors 2c is connected to one deformable membrane 43. The injection of currents into said members produces electrical charges therein. The electrostatic repulsion or attraction between the membranes 43 and the membrane 44 will cause deformity of either of said membranes according to the construction of the image detector. As was explained above in some cases it is preferable to deform the membranes 43 or their modifications in other cases it is preferable to cause deformation of the membrane 44 or its modifications. The deformities of the membranes can be readout by the light beam 7 or its modifications as was explained above and converted into a visible image or applied to other utilization means.

The main value of this embodiment of invention resides in the possibility of amplification of each image point represented by its individual electrical current before the readout.

It should be understood that in all devices using preamplification, instead of electrostatic image detector 40 or its modifications, the image detector 19 or its modifications may also be used. The electrical currents amplified by array of amplifiers 31 will be fed into individual gas cells and cause heating and expansion of the gas. In this modification the layer 25 of black gold will be preferably replaced by the layer of a high electrical resistance.

It was found that with very low intensities of the image-forming radiation, the electrical charges or potentials produced by the image reactive screens such as 32, 35 or 36 were too weak to modulate the image detectors. The solution of this problem was found in preamplification of said weak charges or potentials prior to their use for modulation of image detectors. Such modification of image system reactive to infrared radiation is shown in FIG. 7A. The image-reactive screen comprises a layer of photoconductive material such as for layer 86 or 36 described above preferably in the form of a mosaic of separate elements or of a continuous layer. For microwaves or radar a mosaic of cells such as cells of TlS or SiC may be preferable.

A two-dimensional array of electrical conductors 2c such as wires imbedded in the dielectric matrix plate such as of glass 2d or plastic but being free from insulation at both ends is joined to the mosaic layer 36 to make an electrical contact with said layer. The infrared-transparent electrically conducting layer such as 87 or 36a is mounted in contact with opposite free ends of conductors 2c and is connected to the source of electrical power. The impingement of infrared or microwaves radiation image on the layer 36 produces therein electrical charges. These charges or currents flow through said conductors 2c to the electrostatic image detector 40 or its modifications. The currents are preferably amplified by individual amplifiers 31 of vacuum or preferably of solid-state type interposed between each of conductors 2c and the image detector 40. Each of electrical conductors 2c is connected to one deformable membrane 43. The injection of currents into said members 43 produces electrical charges therein. The electrostatic repulsion or attraction between the membranes 43 and the membrane 44 will cause deformity of either of said membranes according to the construction of the image detector. As was explained above in some cases it is preferable to deform the membranes 43 or other modifications in other cases it is preferable to cause deformation of the membrane 44 or its modifications. The deformities of the membranes can be readout by the light beam 7 or its modifications as was explained above and converted into a visible image.

It should be understood that in all these devices instead of electrostatic image detector 40 or its modifications, the image detector 19 or its modifications may also be used. The electrical currents amplified by array of amplifiers 31 will be fed into individual gas cells and cause heating and expansion of the gas. In this modification the layer 25 of black gold will be preferably replaced by the layer of a high electrical resistance.

A modification of the image system reactive to supersonic radiation is shown in FIG. 7B. The detector 2a comprises a layer 2b of piezoelectric or magnetostrictive material in the form of a mosaic of separate elements or of a continuous layer of materials described above for layer 2.

A two-dimensional array of electrical conductors 2c such as wires embedded in the dielectric matrix such as of glass 2d or plastic but being free from insulation at both ends is joined to the layer 2b to make an electrical contact with said layer. The impingement of sonic radiation image on the layer 2b produces therein electrical charges or currents by a piezoelectric or magnetostrictive effect. These charges or currents flow through said conductors 2c to the electrostatic image detector 40, 91 or its modifications. The currents are preferably amplified by individual amplifiers 31 of vacuum or preferably of solid-state type interposed between each of conductors 2c and the image detector 40. Each of electrical conductors 2c is connected to one deformable membrane 43. The injection of currents into said members 43 produces electrical charges therein. The electrostatic repulsion or attraction between the membranes 43 and the membrane 44 will cause deformity of either of said membranes according to the construction of the image detector. As was explained above in some cases it is preferable to deform the membranes 43 or their modification, in other cases it is preferable to cause deformation of the membrane 44 or its modifications. The deformities of the membranes can be readout by the light beam 7 or its modifications as was explained above and converted into a visible image or applied to other utilizations means. The main value of this embodiment of invention resides in the possibility of amplification of each image point represented by its individual electrical current before the readout.

It should be understood that instead of the image detector 40 and its modifications also image detector 19 and its modifications may be used as was explained above.

It should be understood that all embodiments of invention which use wire conductors 2c may have a vacuum envelope to house image-reactive screens, and/or image detectors, and/or readout light systems.

In some cases the readout of images may be done by means of an electron beam instead of the light beam. In such modification, the ends of the conductors 2c will be in the vacuum tube and will be exposed to irradiation by the electron beam either of scanning type or of a broad beam type for the purpose of readout. In such case, the image detectors are omitted.

It should be understood that in some applications signals which are one-dimensional, as distinguished from images which have at least two dimensions, may be sufficient. In such cases the image detectors 2, 19, 40 and all their modifications will be in the form of a single element of large size instead of a two-dimensional array or radiation-responsive elements. In such cases the readout light beam 5a does not have to be of scanning type anymore and the scanner 5 may be therefore omitted. The rest of the construction remains the same. It should be understood that this modification of invention to be used for signals only applies to all embodiments described herein.

Another embodiment of this invention is shown in FIG. 9. The scanning source 93 of image-forming radiation produces successive image points, one after the other. Each of said image points is projected on the photoemissive photocathode 42 of the novel radiation-detecting device 37 and is converted into an electron or other particles beam corresponding to said image point. The scanning type of image radiation may be produced by using a light source combination with any scanners known in the art or by using a flying spot kinescope tube. If self-emitted radiation is used it will be converted into a scanning image radiation by using any scanner known in the art.

It should be understood that instead of light-sensitive photocathode 42, all screens or photocathodes reactive to neutrons or gamma rays described in this specification may be used in the detecting device 37 if needed. The beam of particles is projected onto novel signal detector 38 of gas type or of electrostatic type which were described above, but which is of unicellular construction. It means that the signal detector 38 consists of one or a few units only in distinction to the two-dimensional array of plurality of detector cells or members which characterize all previously described image detectors such as 19, 40, 40a, 40b and all others. Besides this difference, the novel signal detector 38 has the same construction as was described above for image detectors 19, 40, 40a, 40b and others. The deformity of the signal detector 38 represents now one image point. This deformity is readout by the laser or other source 4 of monochromatic light as was described above and which may be of nonscanning type. The modulated light beams are converted successively into electrical signals by photoelectric devices 11 and said signals may be used for image-reproducing means or other utilization devices as was described above. Another modification of scanning radiation-detecting device is shown in FIG. 9A. In this embodiment the detecting device 37a has an input screen which responds to radiation not be emitting a beam of electron or other particles but by producing a pattern of electrical charges or potentials such as in screens 2b, 42, 35 or 36 and their modifications described above. The electrical pattern directly or preferably after preamplification by the amplifier 31, as it is shown in FIG. 7B or FIG. 7C, acts on the unicellular signal detector 38 which has the construction of detectors 88, 91 or 40 and all their modifications but is of unicellular type. As was explained above, it means that the signal detector 38 consists only of one or of a few units in distinction to the two-dimensional array of plurality of detecting cells or units which characterized detectors 88 or 40 and their modifications.

The deformity of the signal detector 38 represents now one image point. This deformity is readout by the laser or other source 4 of monochromatic and preferably coherent light as was described above and which may be in this embodiment of nonscanning type. The modulated light beam is converted successively by photoelectric devices 11 into electrical signals which may be used for various applications as was described above.

The electrical signals are fed into one of storage devices which were described above and are assembled together to reproduce a two-dimensional image corresponding to the examined object. Synchronization means are provided to synchronize the scanning image-forming radiation from the source 93 with the image reproducing means. Such synchronization means are well known in the television art and it is believed therefore that their detailed description is not necessary.

Instead of photoelectric devices, also photosensitive devices such as photographic, xerographic or other type of films or plates may be used. The image will be built up on such photosensitive devices by successive production of image points and assembling them into a two-dimensional pattern by synchronization means which synchronize the source of scanning image-forming radiation 93 with the light readout beam, as it is known in the television art.

It was found that the present devices for low-light photography or for high-speed photography may be greatly improved by the use of the above-described invention. Photographs, taken with the amount of light which was insufficient to produce a meaningful image, were made useful by the use of above-described interferometric light readout devices. It was found that photographic material or any other light-sensitive material will not produce a definite image therein until the precipitation of silver or other element used in the particular photosensitive material will reach the thickness of a few thousand Angstroms. Until the above thickness is reached, the conventional light will pass through such film or will be reflected by such film without being sufficiently modulated to provide the information. It was found, however, that by the use of interferometric readout device provided with a monochromatic, collimated and preferably coherent light as described above, the thickness of much smaller deposits of silver or other elements can be determined. In a modification of the devices described above, a photograph or other photosensitive film or plate exposed with light insufficient for formation of the image, will be placed in one of devices described above which use readout beam of scanning type, such as devices illustrated in FIG. 1, 1A, 2, 3A, 4, 4A, 5, 6, 6A or 6B, instead of the image detectors which were used in said devices. In another modification, the photograph or other photosensitive plate is used in the devices described in FIG. 9 or 9A instead of the image detector used in these devices.

It was found that the photographic plate or other photosensitive member should be coated on the side exposed to the readout light beam or on both sides with a highly reflecting homogenous layer such as of silver. This layer should not exceed a thickness of 500 A. Instead of a layer of silver, the reflecting layer may be produced by a single or plural dielectric-reflecting layers such as of magnesium fluoride and zinc sulphide. Such combination may give reflectance approaching 0.95. It should be understood that the use of dielectric-reflecting coatings applies to all embodiments of this invention.

The reproduction of interferometric image into a form which presents for the observer a meaningful two-dimensional image will be done in the same way as described above.

It follows that the sensitivity of the present photographic materials or devices can be improved by a large factor and much better results will be obtained in low-light photography, high-speed photography, in electron microscopy and many other applications.

The light readout devices described in specification permit construction of novel type of microscopes for all visible and invisible radiations. In particular the devices described above and illustrated in FIG. 1, 1A or 7B can be used as supersonic microscopes. In this modification, the sonic-image-reactive elements must be of the size corresponding to the desired degree of microscopic resolution. Instead of making supersonic-radiation-reactive elements of microscopic size, the supersonic beam after irradiation of the examined object may be enlarged by acoustic lenses or mirrors so that the size of enlarged image points will match the size of sonic-radiation-reactive elements. Further enlargement of the sonic image may be obtained by producing divergence of the combined beam 10 by suitable optical means before projecting said beams onto photoelectric or photosensitive receiving means 11.

The devices described above and illustrated for example in FIG. 2A or 7A may be used as infrared microscopes in the same manner as was explained above.

If supersonic or infrared image-producing radiation is of scanning type, the detector may be of signal type as it is described in specification and shown in FIG. 9 or 9A. In this embodiment of invention, there is no limitation anymore as to the size of the image-reactive member or of image detector so far as the resolution of images is concerned.

It was found that the wall of the enclosure for all image detectors such as 40, 40a or its modifications may cause false images if it is not perfectly homogenous. This problem is solved by passing both the readout light beam and reference light beam through said wall whereby effects of any imperfections in said wall are cancelled. In other modifications of this invention the surface of the image detectors which is exposed to the readout light beam, is outside of the enclosure and is therefore exposed to the readout light beam without any intervening wall. This is shown in FIG. 6B and 6D and it should be understood that this construction may be used for all other embodiments of invention.

It should be understood that various modifications of the above-described detectors may be used for the purpose of this invention. In particular some infrared detectors 86 such as of germanium or silicon or other described above when exposed to a nonmodulated radiation of atomic particles or of short waves electromagnetic radiation such as ultraviolet at the time of their exposure to the image-forming radiation change their index of refraction. It was found that this exposure should be of the order 0.1 watt/cm.$^2$. The effects of such exposure may cause increase or decrease of the index of refraction according to the material used. This change of the index of refraction may be readout by a transmitted or reflected beam light system of interferometric type or of phase type as was described above. If a transmitted readout light beam is used in this modification of invention, the light beam should be of wavelength to which the infrared detector is at least partially transparent. The nonmodulated heating radiation should be synchronized with the image-forming radiation so that both radiations will arrive to the infrared detector at the same time and will impinge on the same area of said detector.

It was found that the sensitivity of supersonic detectors 2 or its modifications and of supersonic devices may be improved in the same manner as was described above for infrared devices.

It should be understood that this modification using a heating nonmodulated beam of radiation in addition to signal- or image-modulated radiation applies to all devices described in specifications both of signals and of image-producing type.

It should be understood that the preamplified electrical currents can also act on the image detector such as 91 or its modifications if it is mounted in contact or in a close spacing such as not exceeding 10 microns from the free ends of wires 2c.

The image detector 19 may be simplified by using instead of gas cells 20 a member such as a membrane 24 of a plastic of materials described above or of MgO or $Al_2O_3$ which will respond to infrared or other heat-producing radiations by an expansion. It means that instead of deformities of the membrane 24 produced by expansion of the gas as was described above, I use the deformity caused by the expansion of the membrane itself. The membrane should be preferably mounted under a pressure so that its expansion will be in a desired direction.

It was found that in some cases it is preferable to provide electrical charges to membrane 44 or 88 or their modifications by means of electron gun or other source 84 of atomic particles. Electron gun 84 may be mounted obliquely so that it will not obstruct light beam, as shown in FIG. 6D. The source of particles 84 deposits negative charges or positive charges on the membrane 44 or screen 91. The membrane 44 is of semiconducting material such as glass or MgO or $Al_2O_3$ suitably doped. The deposited electrical charges on the membrane 44 migrate to the opposite side of the membrane 44 where they exert electrostatic forces on the membrane 43, as was explained above. If the readout is done through membrane 44 is must be transparent to the readout light beam. If the readout is done from the side of membrane 43 which is facing the light beam, the membrane 44 does not have to be transparent to said light.

It should be understood that the above-described electrical charging of all image detectors such as provided with membrane 44 or its modifications or of screen 91 and its modifications with electrons or other ionized particles applies to all embodiments of the invention in this specification.

It should be understood that this invention contemplates the use of various television techniques known in the art for improving the contrast or for artificially modifying the contrast of the images produced by all devices described in specification. In particular subtraction techniques for video signals may be used for reducing the background caused by nonmodulated reference light beam. It is also intended to make the use of techniques for reproducing the image in natural or in arbitrary colors.

It is also intended to make use of all type of storage devices for the buildup of images or for the prolonged inspection of images, for the purpose of this invention.

It should be understood that it is intended to use in all devices described in specification means for discriminating the background radiation such as means for chopping the image-carrying radiation or modulating or pulsing said image-forming radiation. In addition, all devices may be provided with means for thermal insulation from the background if necessary.

All image or signal detectors should preferably be constructed to take the advantage also of the heating effect of the image-carrying radiation and such construction represents an important feature of this invention. To accomplish this purpose, the image-detecting elements of said image or signal detectors should be mounted in such a manner that their heat expansion due to the absorption of the image-carrying radiation will add to the motion or deformity caused by electrical forces and enlarge said motion or said deformity.

It should be understood that interference patterns may have various forms of fringes or have a different shape from said fringes and that all such different forms and modifications of interference patterns may be used for the purpose of this invention.

It was found that the use of coherent monochromatic light as distinguished from noncoherent monochromatic light improves greatly the sensitivity of all devices described in the specification and the use of coherent light such as produced by a laser is intended for all embodiments of invention.

It was found that monochromaticity of the readout light 4 is an essential feature of all these devices and the more perfect is said monochromaticity the better is the sensitivity of the device. Narrow band transmission filters 16a serve for this purpose.

It was also found that the source 4 of monochromatic radiation should be selected to produce the wavelength which is fully reflected by the surface of the image detector.

The beam splitter or optical reference mirrors should have their surface optically flat to the highest degree possible.

It should be understood that all devices described in specification which use light beam of scanning type for readout of images can be modified to use instead of interference readout system a foucault optical system or a schlieren optical system. This causes, however, a great loss of sensitivity and may be used therefore only in limited applications in which there is no need for sensitivity of detection. There are many varieties of foucault and schlieren optical systems such as devices using curved mirrors, knife edge deflection of light beam or slits and bars. Schlieren and foucault devices are well known in the art, it is believed, therefore, that their detailed description is not necessary.

It should be understood that in some cases I may use the combination of interferometric and of phase effects in one device and that such combination may be used in all embodiments of invention.

It should be understood that the words "light" in specification and in the appended claims embrace both visible and invisible electromagnetic radiations.

It should be understood that the words "optical changes" of detectors in specification and in the appended claims embrace deformities and/or changes in shape or in dimensions of said detectors and/or changes of their index of refraction.

It should be understood that words "detectors operating by electrical forces" apply to all detectors in which the "optical changes" in the detectors are caused by electrical forces representing a whole image or an image point whether they be of electrostatic, piezoelectric, photoconductive or photovoltaic type. It should be also understood that words "detectors operating by mechanical forces" apply to all detectors in which the "optical changes" in said detectors are caused by heat effects or by pressures representing a whole image or an image point.

Although there has been described a preferred embodiment of this novel invention, many variations and modifications will now be apparent to those skilled in the art. Therefore, this invention is to be limited, not by the specific disclosure herein, but only by the appended claims.

What I claim is:

1. An imaging device comprising in combination means for producing an invisible radiation to irradiate an examined object and to produce thereby radiation carrying an image information corresponding to said object, means for producing a first monochromatic beam of light, means for detecting said image-carrying radiation, said detecting means receiving said radiation from said object and exhibiting optical changes in response to said radiation, means for projecting said light beam on said detecting means, means for producing a scanning irradiation of said detecting means with said first beam of light, means providing for said first light beam in said scanning irradiation substantially the same angle of incidence at all successive points of incidence of said light beam on said detecting means, means for producing a second beam of monochromatic light, said second light beam being at an angle in relation to said first light beam, means for combining both said first and said second beam after said first beam has been modulated by said detecting means to produce readout information of said optical changes, and photoelectric means for receiving said combined beam carrying said scanning readout information, and means for reproducing an image corresponding to said examined object.

2. A device as defined in claim 1, in which said detecting means for said radiation comprise piezoelectric means and in which said radiation is a sonic radiation.

3. A device as defined in claim 1 which includes means for producing microscopic images of sonic radiation.

4. A device as defined in claim 1 which includes means for producing a scanning motion of said detecting means.

5. A device as defined in claim 1 which includes means for producing a scanning motion of said light beam.

6. A device as defined in claim 1, in which said photoelectric means comprise a television pickup tube.

7. A device as defined in claim 1, in which said optical changes are reversible.

8. A device as defined in claim 1, in which said detecting means comprise a plurality of individual detecting members discontinuous from each other.

9. A device as defined in claim 1, in which said optical changes are deformations of said detecting means.

10. An imaging device comprising in combination means for producing an invisible undulatory radiation to irradiate an examined object and to produce thereby radiation carrying an image information corresponding to said object, means for producing a monochromatic stream of light, means for dividing said light stream into a first plurality of individual light beams, means for detecting said image-carrying radiation, said detecting means receiving said radiation from said object and exhibiting optical changes in response to said radiation, means for directing said first plurality of light beams to said detecting means, said detecting means modulating said first plurality of light beams with said optical changes, means for producing a second plurality of monochromatic light beams, said light beams of said second plurality being at an angle in relation to said light beams of said first plurality, means for combining together said light beams of said first plurality with said light beams of said second plurality after said first plurality of light beams has been modulated by said detecting means to produce a plurality of combined light beams carrying readout information of said optical changes, and photoelectric means for receiving said plurality of said combined light beams and said readout information carried by said plurality of said combined light beams simultaneously, and means for reproducing the image corresponding to said examined object.

11. A device as defined in claim 10, in which said detecting means for said radiation comprise piezoelectric means and in which said radiation is a sonic radiation.

12. A device as defined in claim 11, in which said piezoelectric means comprise an evaporated piezoelectric layer.

13. A device as defined in claim 10 which includes means for producing microscopic images of sonic radiation.

14. A device as defined in claim 10, in which said detecting means comprise a plurality of individual detecting members spaced apart from each other.

15. A device as defined in claim 10, in which said photoelectric means comprise an image tube.

16. A device as defined in claim 10, in which said photoelectric means comprise a television pickup tube.

17. A device as defined in claim 10, in which said optical changes are deformations of said detecting means.

18. A device as defined in claim 10, in which said optical changes are reversible.